April 30, 1929.   J. A. WRIGHT   1,711,216
FRONT AXLE ASSEMBLY
Filed April 12, 1927   2 Sheets-Sheet 1
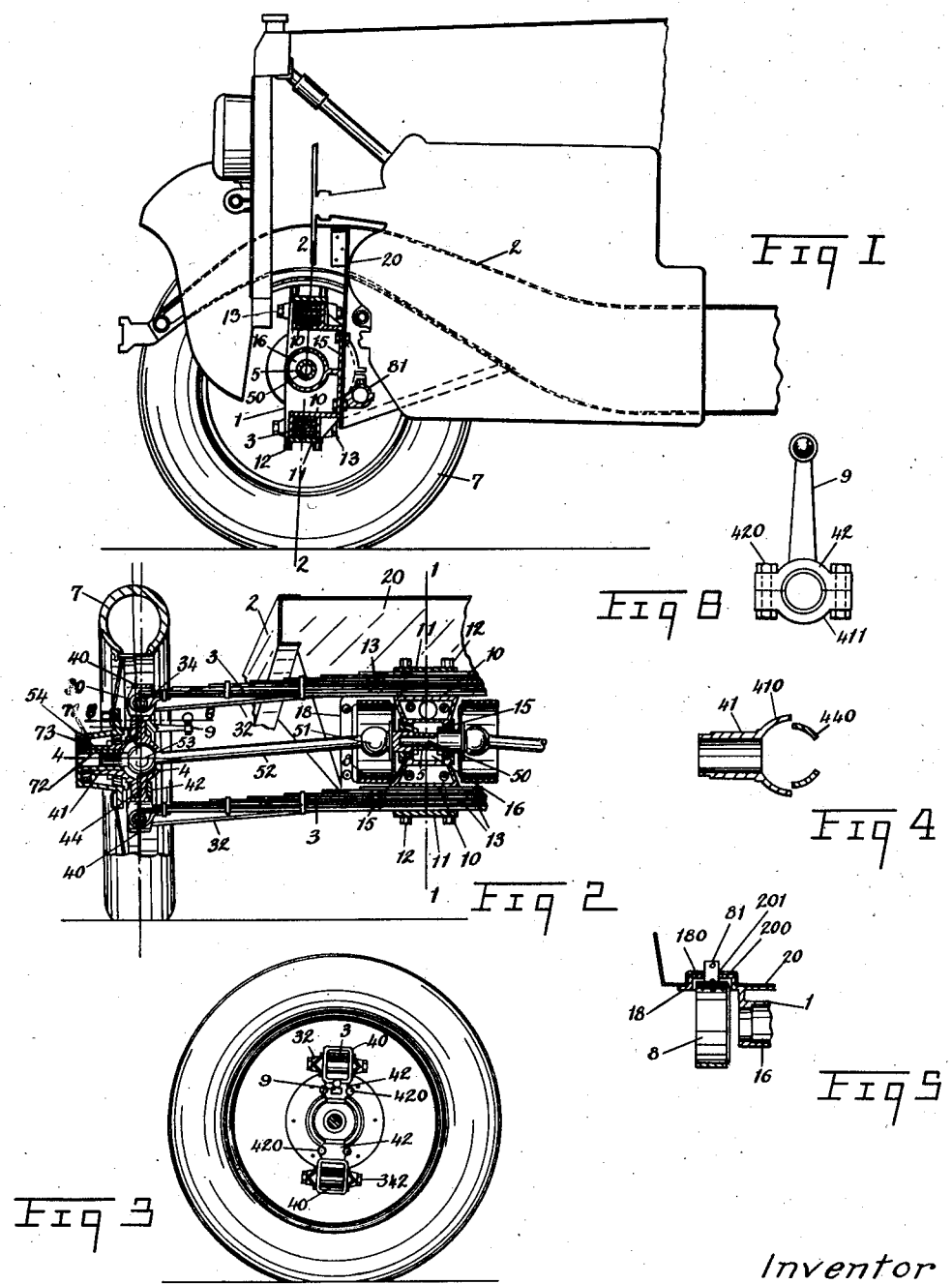
Inventor
James A. Wright.
By
Attorney Inventor
James A. Wright.
By
*Attorney*

Patented Apr. 30, 1929.

1,711,216

UNITED STATES PATENT OFFICE.

JAMES A. WRIGHT, OF MONTREAL, QUEBEC, CANADA.

FRONT-AXLE ASSEMBLY.

Application filed April 12, 1927. Serial No. 183,154.

This invention relates to the front axle assembly of motor vehicles in which individual wheel action is obtained by transverse spring suspension and front wheel brakes are provided.

The object of this invention is to provide a front axle assembly for motor vehicles in which the unsprung weight is reduced to a minimum and the individual wheel action is obtained by a system of parallel springs, radius rods and braking shafts between the yoke block or differential casing and the load plane of the wheel.

By means of this system the wheels are maintained in their true position in relation to the chassis and can only move vertically on the radius of their connections with the chassis and pivot on the vertical load plane of the wheel.

The arrangement of these connections is such that all torsional and other stresses from all directions are fully absorbed without displacing the wheel.

A further object is to provide front wheel brakes which do not add to the unsprung weight but are supported on the chassis and brake axles.

A further object is to provide wheel carriers which support the brake shaft universal joint, the spring terminals, and the radius rod pivots in the load plane of the wheel.

Further objects will be set forth in the specification hereinafter.

Fig. 1 is a vertical cross section on the line 1—1 of Fig. 2.

Fig. 2 is a vertical cross section on the line 2—2 of Fig. 1.

Fig. 3 is an inside view of the wheel and wheel carrier.

Fig. 4 is a horizontal cross section on the line 4—4 of Fig. 2.

Fig. 5 is a detail view of the central portion of the yoke block and brake drum recess.

Fig. 8 is a horizontal cross section on the line 8—8 of Fig. 3.

Figure 7:
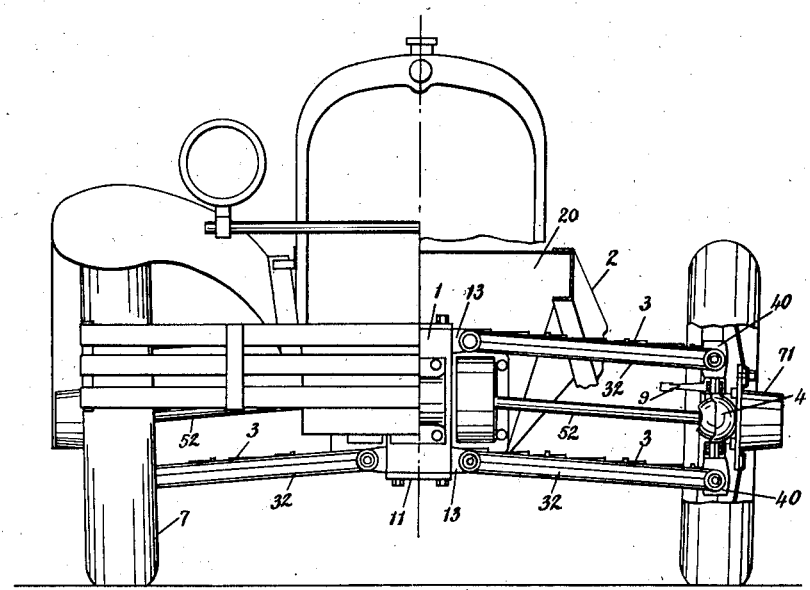
Fig. 7 is a front view.
Figure 6:
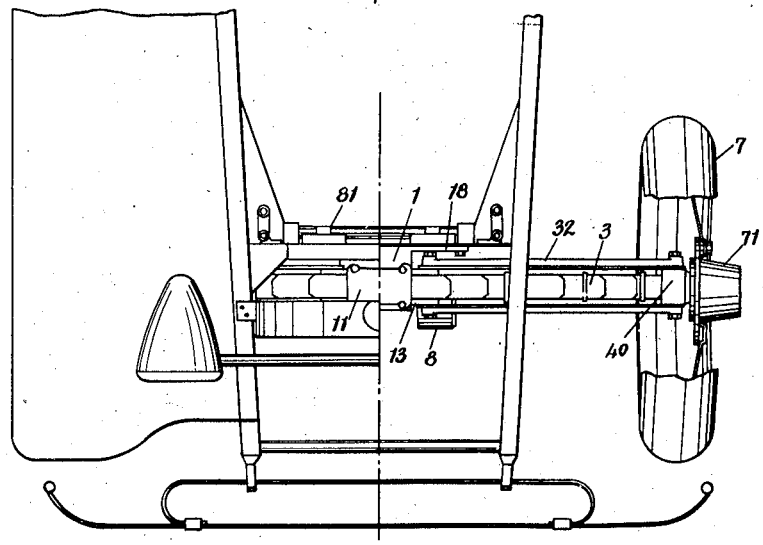
Fig. 6 is a general plan view.

A yoke block 1, with U shaped seats 10, for the transverse springs 3, is secured to the chassis frame 2, by the vertical apron 20.

The yoke block 1, has a central transverse tubular passage 16, with bearings 15, at each end which journal the ends of the brake shafts 5, 50, one of which is a sleeve 5, mounted on the other shaft 50.

The springs 3, are secured to the seats 10, by anchor plates 11, with screw bolts 12. The sides of the seats 10, extend outwardly to form bracket bearings 13, for the radius rods 32.

The wheel carriers 4, consist of two parts, one of which has a semi-spherical center 410, with half sleeves 411, projecting upwards and downwards and a main sleeve 41, projecting outwardly. The other part has a semispherical center 440, with upper and lower pivot extensions 44, which terminate in rectangular bearing sockets 40, and forms the king pin for the wheel 7. The two parts are assembled by two half sleeves 42, which are bolted to the above mentioned half sleeves 411, by the bolts 420, about the pivot extensions 44. The steering arms 9, project from the upper half sleeves 42.

Wheels 7, of the disc type have hubs 71, cupped outwardly with inwardly projecting stub axles 72, which are mounted in the sleeves 41, of the wheel carriers 4. Roller bearings 73, are mounted between the hubs 71, and these sleeves 41.

The wheel carriers 4, having the axis of the king pins 44, vertical in the load plane of the wheel 7, are coupled to elongated loops 30, at the ends of the springs 3, in the rectangular bearing sockets 40, by sleeve bolts 34.

Radius rods 32, are pivoted on these bolts 34, by nuts 342, on each side of the bearing sockets 40, at one end and on the bracket bearings 13, of the yoke block 1, at the other end.

These radius rods 32, on each side of the springs 3 maintain the king pin 44, of the wheel carriers 4, parallel to the central line of the chassis and prevent the displacement of the wheel.

The yoke block 1, at its rear side has outwardly extending flanges 18, with recesses 180, shaped to fit recesses 200, in the apron 20, and form part of the brake drum casing.

The brake drums 8, are mounted on the brake shafts 5, 50, outside the bearings 15, at each end of the central transverse passage 16. The brake bands 80, are controlled by mechanism 81, mounted at the rear side of the apron 20, on the recesses 200, through slots 201, in the apron 20, and flanges 18.

The brake shafts 5, 50, are coupled by ball joints 51, in the plane of the radius rod pivots 13, to intermediate shafts 52, which are coupled by ball joints 53, within the wheel carriers 4, to splined spindles 54, meshing with the tubular stub shafts 72, of the wheel hubs 71.

With this construction the front end of the chassis is supported on transverse springs extending to the load plane of the wheel where the weight is transferred to wheel carriers on which the wheels are journalled. These wheel carriers are maintained in vertical position by the springs and the radius rods at their sides. The rotating portion of the wheel carrier enables the wheel to pivot on the central line of the load plane when turned by the steering arm of which it forms a part.

The brake shafts, one of which is a sleeve about the other, being journalled in the yoke block, provide central support, and the brake drums transmit the braking torque to these brake shafts without creating other stresses and without loss. The braking mechanism is almost entirely supported on the springs thereby reducing the unsprung weight to a minimum.

The radius rods resist all stresses but those in a vertical direction which are absorbed by the springs.

As the intermediate shafts are the same length as that of the radius rods and are pivoted at each end in the same planes, they are maintained parallel to the radius rods at all times.

The torque stresses of the brake drums are transmitted to the wheel hubs through the brake shafts without effect on the wheel carriers and without any movement of the splines in the stub axles.

What I claim is:

1. In a front axle assembly, a yoke block supported on the chassis frame, having transverse springs mounted in seats on the top and bottom of the yoke block, bracket bearings extending outwardly on each side of the springs, a wheel carrier, wheels journalled thereon, a king pin having terminal spring sockets, in which the ends of the springs are pivoted, mounted in the vertical bearings in the load plane of the wheel, and radius rods pivoted to the bracket bearings and to the spring pivots on each side of the terminal spring sockets.

2. In a front axle assembly, a yoke block supported on the chassis frame, having transverse springs mounted in seats on the top and bottom of the yoke block, bracket bearings extending outwardly on each side of the springs, with a wheel carrier in two parts, one part journalling the wheel hub, and providing vertical bearings for the other part which forms the king pin of the wheel and carries terminal bearing sockets in which the ends of the springs are journalled, in the load plane of the wheel, and radius rods pivoted to the bracket bearings and to the terminal bearings on each side of the springs, with brake shafts journalled in the yoke block and extending to the wheel hub, having ball joints in the plane of the bracket bearings and in the load plane of the wheel.

3. In a front axle assembly, transverse springs mounted in seats on the yoke block, having their looped ends journalled in bearings in the load plane of the wheel, at the upper and lower ends of one portion of the wheel carrier, which is vertically journalled in the other portion from which the sleeve projects on which the hub of the wheel is journalled having radius rods on each side of the springs, pivoted on the said bearings and on bearing brackets projecting from the sides of the spring seats, and brake shafts journalled in the yoke block, having brake drums mounted thereon at the side of the yoke block, which brake shafts extend to the wheel hubs, with intermediate parts terminating in ball joints, in the load plane of the wheel and in the plane of the bracket bearings.

4. In a device of the class specified, a wheel having an annular grooved hub, a wheel carrier comprising a sleeve journalled in the groove of the hub, having vertical bearings above and below the sleeve, a king pin with semi-spherical center, journalled in the vertical bearings, having rectangular spring sockets projecting above and below.

5. In a device of the class specified, a wheel having an annular grooved hub, a wheel carrier comprising a sleeve journalled in the groove of the hub, having vertical bearings above and below the sleeve, a king pin with semi-spherical center, journalled in the vertical bearings, having rectangular spring sockets projecting above and below, and having a steering arm projecting from one of the vertical bearings.

6. In a front axle assembly, a yoke block secured to the chassis frame by means of a vertical apron, which supports brake gear, controlling brake bands on drums mounted on brake shafts journalled in the yoke block, having flexible couplings to the wheel hubs.

7. In a front axle assembly, a yoke block secured to the chassis frame by means of a vertical apron, which supports brake gear, controlling brake bands on drums mounted on brake shafts journalled in the yoke block, having flexible couplings to the wheel hubs, and transverse springs mounted in seats on the yoke block having their ends journalled in wheel carriers on which the wheel hubs are journalled.

JAMES A. WRIGHT.